Aug. 20, 1963  M. J. LALICK  3,101,291
ARTIFICIAL CHRISTMAS TREES
Filed Aug. 12, 1960  2 Sheets-Sheet 2
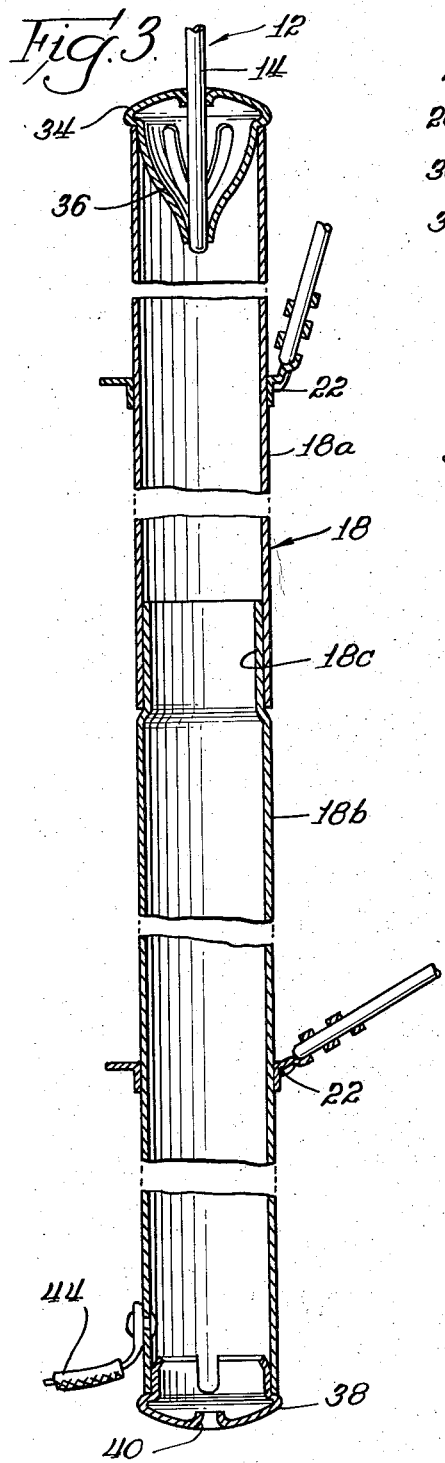
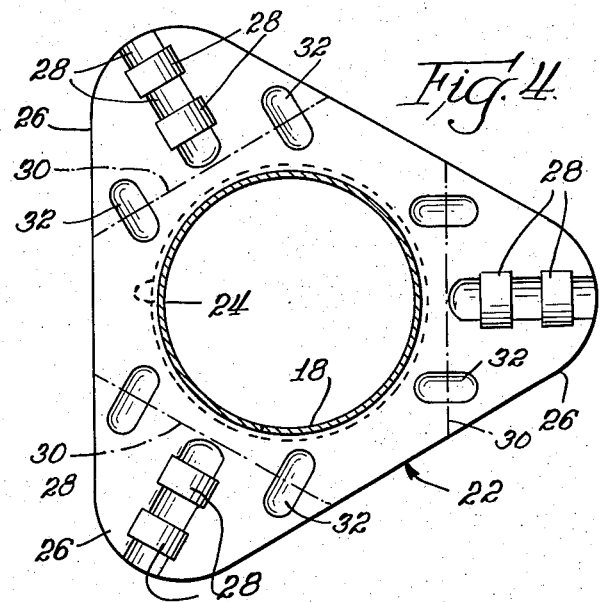
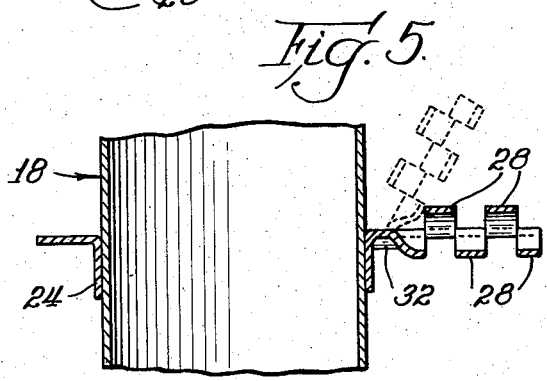
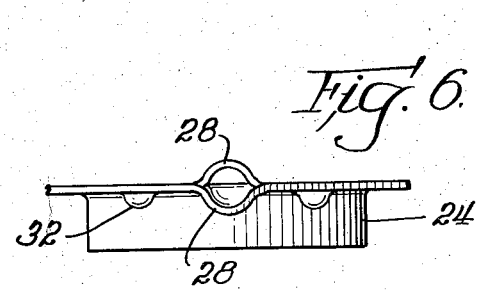
INVENTOR.
Michael J. Lalick
BY
Stephen J. Rudy
Atty.

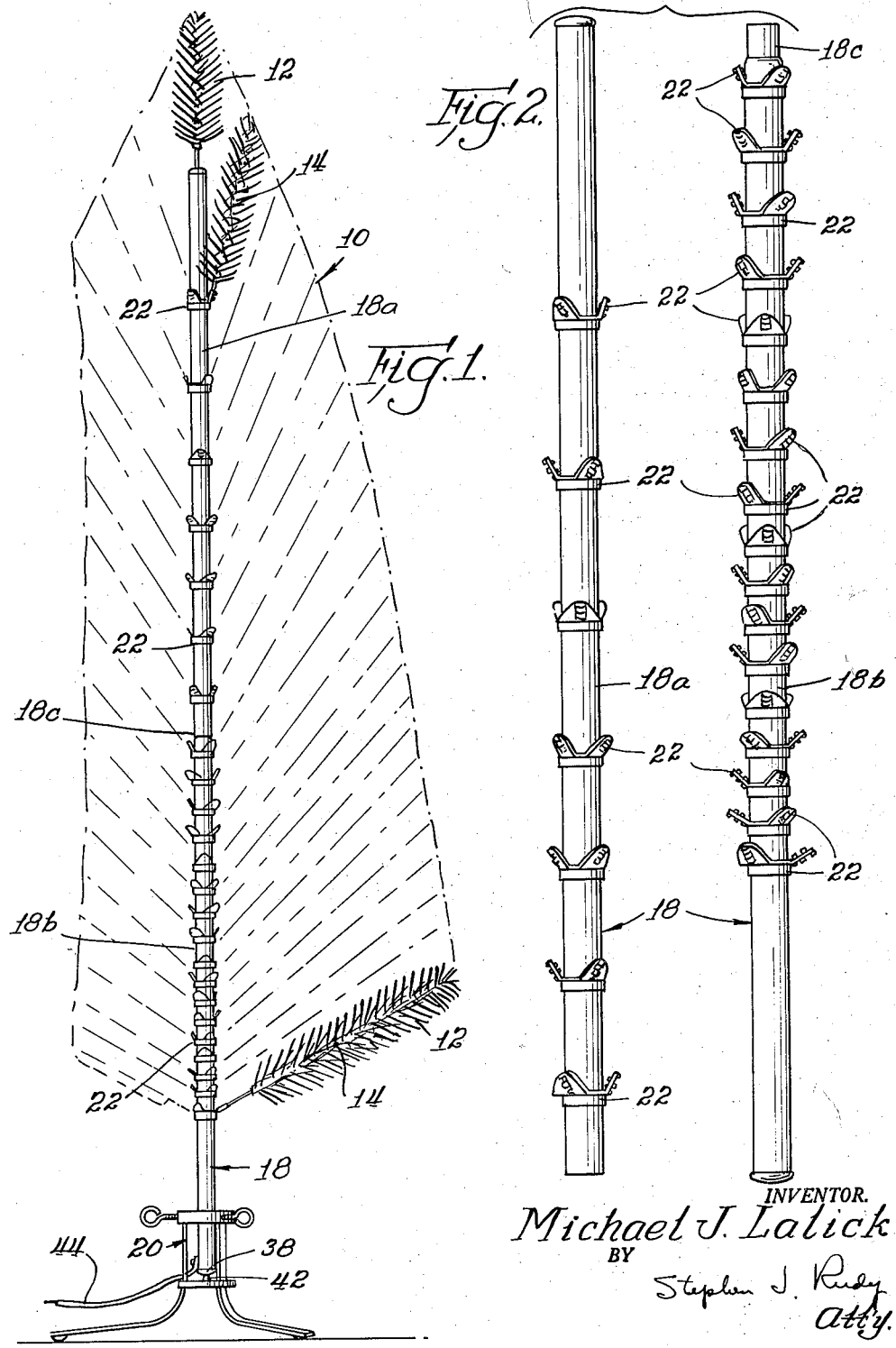

United States Patent Office 3,101,291
Patented Aug. 20, 1963

3,101,291
ARTIFICIAL CHRISTMAS TREES
Michael J. Lalick, 3700 W. 97th St., Evergreen Park, Ill.
Filed Aug. 12, 1960, Ser. No. 49,242
5 Claims. (Cl. 161—24)

This invention relates to an improvement in artificial Christmas trees and a method of making such trees.

Artificial Christmas trees of the type having metallic branches made of thin, slitted aluminum foil, have been gaining in popularity since their introduction on the market several years ago. The outstanding attractiveness of such trees, due to glittering brilliancy, plus the fact that they may be reused year after year, have undoubtedly contributed to such popularity. However, a basic disadvantage of such artificial trees has been the danger of electrical shock due to the difficulty, or impracticality of grounding all the metal branches. In the tree of the present invention, the problem of providing adequate electrical gounding is solved in a simple and effective manner. In addition, the process for fabricating a tree according to the invention, lends itself to making trees of various sizes and foliage distribution with the use of the same basic components, thus eliminating the need for a multiplicity of expensive tools, such as drill jigs, and simplifying inventory procedures and costs.

The main object of this invention is to provide an improvement in artificial Christmas trees.

A more specific object of this invention is to provide an artificial Christmas tree which may be easily and effectively electrically grounded.

Still another object is to provide a method for fabricating an artificial tree wherein various tree sizes and foliage distribution may be made with the use of the same basic components, thus reducing tooling costs and simplifying inventory procedures and costs.

These and further objects and features of the invention will become more apparent from the following description and accompanying drawings wherein:

FIG. 1 is an illustration of an all-metal tree embodying the principles of the invention and showing in detail certain elements thereof;

FIG. 2 is a view of a sectionized tree trunk used in the artificial tree of FIG. 1;

FIG. 3 is an enlarged vertical section view (broken sections) of the tree trunk of FIG. 2 in assembled condition;

FIG. 4 is an enlarged plan view of a branch holding collar as used on the tree trunk of FIG. 3;

FIG. 5 is a partial section view of the tree trunk of FIG. 2; and

FIG. 6 is a side view of the collar of FIG. 4.

Referring now to the drawings and more particularly to FIG. 1, the numeral 10 identifies an all-metal Christmas tree embodying the principles of the invention which tree includes, a plurality of branches 12 each formed of a metal rod 14 upon which has been wound and secured a strip of slitted metal foil, and an all-metal tree trunk 18, which preferably may be formed of two sections 18a and 18b (FIG. 2). A tree base, or holder 20, is provided for maintaining the tree in vertical position during use, in the usual manner.

For the purpose of removably securing each tree branch 12 to the tree trunk 18, a plurality of metal collars 22 are provided, which collars are arranged in predetermined spaced relation upon the tree trunk sections 18a and 18b. The tree trunk sections 18a and 18b are adapted to be removably secured together in axial alignment, and for such purpose an upper portion 18c of the trunk section 18b has an outer diameter slightly less than the inner diameter of the upper portion 18a so that the parts will telescope as shown in FIG. 3. As best seen in FIGS. 1 and 2, the collars are arranged more closely together toward the lower end of the tree so that the tree will present an over-all uniform foliage distribution since the angle between each branch and tree trunk progressively increases toward the lower end of the tree.

Each metal collar includes a cylindrical portion 24 to which are integrally secured three equi-spaced lugs, or ears 26, as best seen in FIGS. 4 to 6 inclusive. Each lug is strip-punched to form a plurality of semi-circular straps 28 arranged so that the axis thereof intersects the axis of the cylindrical portion 24. The opening thus formed in each lug 26 is adapted to snugly receive one end of a tree branch 12. Each lug 26 is bent along a line 30 to form an angle relative to the axis of the cylindrical portion 24. While the bend angle of each lug of a given collar is identical, the angles between the various metal collars 22 differ so that they become progressively greater upon the collars mounted toward the lower end of the tree, as heretofore mentioned. The relative rotational position of each collar upon the tree trunk 18 is varied so that the tree branches 12 will be spaced to provide an effect of full and uniform tree foliage. For stiffening purposes, a pair of elongated indentations 32 may be formed along each bend line 30, as shown. Each collar is permanently affixed in its desired position upon the tree trunk by means such as spot welding, swedging, internal expansion of the tree trunk, etc.

A metal end cap 34 is adapted to be press-fitted into the upper end of the tree trunk 18, which cap is arranged to have internal fingers 36 for clasping the end of a metal rod 14 of a branch 12. A metal end cap 38 is arranged for press-fitting into the lower end of the tree trunk 18, which lower end cap has an opening 40 to receive a centering pin 42 provided on the tree base 20. Affixed to the lower end of the tree trunk 18 is an electric wire 44 which may be used for electrical grounding of the all-metal tree of the invention.

From the foregoing it will be seen that the above described tree, and the method for fabricating such an artificial Christmas tree, will satisfy the objectives of the invention. In particular, it will be apparent that the method disclosed lends itself to the fabrication of trees of various sizes and shapes i.e., foliage distribution, since all that is required is a change in number and spacing of the collars 22 upon the tree trunk sections 18a and 18b, to make any given size tree. If desired, one or more additional tree trunk sections may be inserted between the tree trunk sections 18a and 18b, to make taller trees. Conversely, for a shorter tree than the one illustrated, only the section 18a need be used with addition thereto of an end cap 38. It is to be further noted that the ears 26 of any given collar, or set of collars, may be manually bent to increase or decrease the angle thereof relative to the tree trunk, whereby the tree shape may be varied in any section or sections, as desired. In such manner a more slender tree may be formed, or a wider tree silhouette made possible, either of which may be effected by the tree owner without the need for additional parts or complicated tools, and in a simple and rapid manner.

The foregoing description has been given in detail without thought of limitation since the inventive principles are capable of assuming other forms without departing from the spirit of the invention or scope of the following claims.

What is claimed is:

1. In an artificial tree having a plurality of metallic tree branches, a metallic tree trunk, and means for mounting said branches upon said tree trunk comprising, metallic collars which are selectively affixed in axial spaced relation upon the tree trunk which axial spacing becomes progressively less in the direction of the lower end of the tree, said collars each having integral lugs which are adapted to removably receive a metallic tree branch, said lugs each being manually bendable about a bend line to vary the angle of the lug relative to the axis of the tree trunk.

2. In an artificial tree having a plurality of metallic tree branches, a metallic tree trunk, and means for mounting said branches upon said tree trunk comprising, metallic collars which are selectively affixed in spaced axial relation upon the tree trunk, said collars each having integral lugs which are adapted to removably receive a metallic tree branch, said lugs being bent at an angle to the axis of the tree trunk, the angle of each lug being the same on any given collar but differing from the angles of said other collar lugs, said lugs each being manually bendable about a bend line to vary the angle of the lug relative to the tree trunk.

3. In an artificial tree having a plurality of metallic tree branches, a hollow metallic tree trunk, and means for mounting said branches upon said tree trunk comprising, metallic collars which are selectively affixed in spaced axial relation upon the tree trunk, said collars each having integral lugs which are adapted to removably receive a metallic tree branch, said lugs being bent upwardly relative to the tree trunk and at an angle thereto, the angle of each lug being the same on any given collar, but being arranged so that the angles thereof become progressively greater on the collars going from the top of the tree to the bottom, said lugs being manually bendable about a bend line to change the angles thereof.

4. In an artificial tree having a plurality of metallic tree branches, a hollow metallic tree trunk, and means for mounting said branches upon said tree trunk comprising, metallic collars which are selectively affixed in spaced axial relation upon the tree trunk, said collars each having a cylindrical portion and three integral equi-angularly spaced lugs all the lugs of any given collar of which are bent at a uniform angle to the axis of the cylindrical portion, said collars being arranged so that the angles thereof become progressively greater on the collars going from the top of the tree to the bottom, said lugs being manually bendable about a bend line to change the angles thereof.

5. In an artificial tree having a plurality of metallic tree branches, a hollow metallic tree trunk, and means for mounting said branches upon said tree trunk comprising, metallic collars which are selectively affixed to the tree trunk so that the axial spacing between the collars is progressively smaller from the top of the tree to the bottom, said collars each having a cylindrical portion and three integral equi-angularly spaced lugs all of which are bent at a uniform angle to the axis of the cylindrical portion, said collars being arranged so that the angles thereof become progressively greater on the collars going from the top of the tree to the bottom, and being further arranged so that the angular arrangement of the lugs of one collar relative the tree trunk differs from the angular relation of adjacent collars relative the tree trunk, said lugs being manually bendable about a bend line to change the angles thereof.

References Cited in the file of this patent
UNITED STATES PATENTS

| | | |
|---|---|---|
| 735,010 | Zahl | July 28, 1903 |
| 904,758 | Cropp | Nov. 24, 1908 |
| 1,223,864 | French | Apr. 24, 1917 |
| 1,606,535 | Hojnowski | Nov. 9, 1926 |
| 1,780,181 | Fassen | Nov. 4, 1930 |
| 2,413,610 | Donelson | Dec. 31, 1946 |
| 2,708,324 | Wedden | May 17, 1955 |
| 2,751,523 | Adams | June 19, 1956 |
| 2,893,149 | Reece et al. | July 7, 1959 |

FOREIGN PATENTS

| | | |
|---|---|---|
| 82,609 | Sweden | Feb. 19, 1935 |